United States Patent
Eklund et al.

(10) Patent No.: US 10,347,153 B2
(45) Date of Patent: Jul. 9, 2019

(54) METHOD FOR PROVIDING AN OPERATOR OF A VEHICLE WITH OPERATING INFORMATION

(75) Inventors: Maria Eklund, Örebro (SE); Jonny Lindblom, Eskilstuna (SE)

(73) Assignee: Volvo Construction Equiptment AB, Eskilstuna (SE)

( * ) Notice: Subject to any disclaimer, the term of this patent is extended or adjusted under 35 U.S.C. 154(b) by 264 days.

(21) Appl. No.: 12/668,894

(22) PCT Filed: Jul. 4, 2008

(86) PCT No.: PCT/SE2008/000429
§ 371 (c)(1),
(2), (4) Date: Jan. 28, 2010

(87) PCT Pub. No.: WO2009/011631
PCT Pub. Date: Jan. 22, 2009

(65) Prior Publication Data
US 2010/0184005 A1   Jul. 22, 2010

(30) Foreign Application Priority Data
Jul. 13, 2007   (SE) ...................................... 0701733

(51) Int. Cl.
*G09B 19/16* (2006.01)

(52) U.S. Cl.
CPC .................................. *G09B 19/16* (2013.01)

(58) Field of Classification Search
CPC .......... G09B 19/167; G09B 9/02; G09B 9/04; G09B 9/06; G09B 9/08; G09B 9/052; G09B 5/00

USPC ...................................................... 434/26–71
See application file for complete search history.

(56) References Cited

U.S. PATENT DOCUMENTS

| | | | |
|---|---|---|---|
| 4,150,497 A * | 4/1979 | Weber | 434/71 |
| 6,175,782 B1 | 1/2001 | Obradovich et al. | |
| 6,675,075 B1 | 1/2004 | Engelsberg et al. | |
| 7,920,682 B2 * | 4/2011 | Byrne et al. | 379/88.18 |
| 2003/0108847 A1 | 6/2003 | Reh | |
| 2004/0005926 A1 * | 1/2004 | LeFroy | 463/42 |
| 2006/0024646 A1 * | 2/2006 | Stahl | 434/62 |
| 2006/0061178 A1 * | 3/2006 | Billger et al. | 297/344.22 |

(Continued)

FOREIGN PATENT DOCUMENTS

| DE | 4033574 A1 | 5/1991 |
|---|---|---|
| EP | 1385099 A2 | 7/2003 |

(Continued)

OTHER PUBLICATIONS

International Search Report for corresponding International Application PCT/SE2008/000429.

(Continued)

*Primary Examiner* — Timothy A Musselman
(74) *Attorney, Agent, or Firm* — WRB-IP LLP

(57) ABSTRACT

A method for providing an operator of a vehicle with operating information includes providing at least one predetermined demonstration of the operating information, deciding if one of the at least one predetermined demonstration is desired to be presented to the operator and, if desired, automatically presenting the demonstration to the operator in an operator compartment of the vehicle when the operator is in an operational position.

31 Claims, 11 Drawing Sheets

(56) References Cited

U.S. PATENT DOCUMENTS

| | | | |
|---|---|---|---|
| 2006/0092033 A1 | 5/2006 | Hoff et al. | |
| 2006/0200260 A1 | 9/2006 | Hoffberg et al. | |
| 2007/0021895 A1 | 1/2007 | Brandt et al. | |
| 2007/0070038 A1 | 3/2007 | Hoffberg et al. | |
| 2007/0196808 A1* | 8/2007 | Call | 434/350 |
| 2007/0268123 A1* | 11/2007 | Jung | G01D 5/39 340/531 |
| 2008/0110115 A1* | 5/2008 | French | 52/311.1 |
| 2008/0124692 A1* | 5/2008 | McEvoy et al. | 434/262 |

FOREIGN PATENT DOCUMENTS

| | | |
|---|---|---|
| EP | 1714539 A1 | 10/2006 |
| WO | 9834812 A2 | 8/1998 |
| WO | 0051097 A2 | 8/2000 |
| WO | 0132472 A1 | 5/2001 |
| WO | 0158724 A1 | 8/2001 |
| WO | 03039914 A1 | 5/2003 |

OTHER PUBLICATIONS

European Official Action (dated Sep. 21, 2016) for corresponding IEuropean Application EP 08 76 7101.
Supplementary European Search Report (dated Mar. 9, 2015) for corresponding IEuropean Application EP 08 76 7101.
Indian Official Action (dated Jan. 13, 2017) for corresponding Indian Application 22/MUMNP/2010.
European Official Action (dated Mar. 9, 2018) for corresponding European App. EP 18154474.

* cited by examiner

METHOD FOR PROVIDING AN OPERATOR OF A VEHICLE WITH OPERATING INFORMATION

BACKGROUND AND SUMMARY

The present invention relates to a method for providing an operator of a vehicle with operating information. The term "vehicle" comprises any means for transport on land, sea or in the air. The invention will below be described for a work machine in the form of a wheel loader. This should be regarded as a preferable, non-limiting application of the invention. Especially, it should be noted that the invention is applicable also in other vehicles provided with wheels, such as trucks, buses and cars.

The term "work machine" comprises different types of material handling vehicles like construction machines, such as a wheel loader and a dump truck (such as an articulated hauler). A work machine is provided with a bucket, container or other type of work implement for carrying/transporting a load. Further terms frequently used for work machines are "earth-moving machinery", "off-road work machines" and "construction equipment".

In connection with transportation of heavy loads, e.g. in contracting work, work machines are frequently used. A work machine may be operated with large and heavy loads in areas where there are no roads, for example for transports in connection with road or tunnel building, sand pits, mines and similar environments. Traveling over uneven ground and lifting/transporting loads of different types will subject an operator of the work machine to jerks and vibrations during operation. Such loads may lead to problems of fatigue and/or reduced productivity. It is therefore important that the operator environment in the cab is adjusted in an ergonomically optimum way and that the operator operates the work machine efficiently.

The wheel loader comprises a powertrain for propelling the machine via the wheels. A power source, such as an internal combustion engine, and especially a diesel engine, is adapted to provide the power for propelling the wheel loader. A plurality of operator controlled elements are provided in the cab for controlling the powertrain, such as an accelerator pedal, a gear selector, a brake pedal, a differential lock selector, and an instrument panel with a plurality of buttons for activating different functions, such as automated downshifting, gear shifting mode selector, etc.

The wheel loader further comprises a hydraulic system for performing certain work functions, such as lifting and tilting a work implement and steering the machine. The power source is also adapted to provide the power for controlling the hydraulic work functions. More specifically, one or more hydraulic pumps are driven by the power source in order to provide hydraulic actuators (such as hydraulic cylinders) with pressurized hydraulic fluid. A plurality of operator controlled elements are provided in the cab for controlling the hydraulic system, such as a lift lever, tilt lever, steering lever, and an instrument panel with a plurality of buttons for activating different functions, such as boom suspension, bucket positioning and floating position.

Modern work machines are very sophisticated with a multiplicity of functions available for the driver in order to operate the work machine efficiently. Especially, there are an increasing number of operator controlled elements (levers, buttons and other controls) in the cab. Therefore, there is a desire to develop a system or method that creates conditions for an improved use of all available options and thereby a more efficient operation of the work machine. Especially, there is a desire to further improve operation of the machine by experienced drivers. Further, since work machines are often operated by inexperienced drivers, a system or method, which creates conditions for an improved productivity by inexperienced drivers is also desired.

It is desirable to achieve a method which creates conditions for improving productivity. It is desirable to provide a method that provides an operator of a vehicle with operating information in such a manner that the operator easily and in a time-efficient way can learn how to use the vehicle efficiently.

A method for providing an operator of a vehicle with operating information is provided according to an aspect of the present invention, the method comprising the steps of providing at least one predetermined demonstration of the operating information, deciding if one of said at least one predetermined demonstration is desired to be presented to the operator and if desired, automatically presenting the demonstration to the operator in an operator compartment of the vehicle when the operator is in an operational position.

Thus, the demonstration is presented to the drivers individually while seated in the vehicle. Thus, it is an on-board education, which creates conditions for saving the cost and time required for arranging general driver education seminars. Further, the method creates conditions for each individual driver to repeat the demonstration, or parts of it, if desired.

According to a preferred embodiment, the operating information comprises information regarding an operator environment in the compartment, such as available ergonomic adjustments in the form of seat, armrest, steering colon etc. Preferably, the demonstration comprises a walk-through of a predetermined set of available operator environment adjustments in the operator compartment.

According to a further preferred embodiment, the operating information comprises recommendations on variations in the operator behaviour and/or position during a work shift. In this way, a risk of repetitive strain injuries and musculoskeletal disorders is reduced. The recommendations may comprise usage of safety belt, variation in working posture, micro breaks with stretching etc.

According to a further preferred embodiment, the operating information comprises information regarding operator controlled elements in the compartment for operating the vehicle. Such operator controlled elements may comprise means for controlling a powertrain, means for controlling a hydraulic system and means for controlling a brake system. The operating information comprises a walk-through of a predetermined set (ie not necessarily all) of the operator controlled elements. Preferably, the operating information comprises information regarding the function and/or an optimum use of each of the operator controlled elements.

In a work machine, several systems interact during operation. For example, the engine is adapted to provide power both for propelling the machine via the wheels and to the hydraulic system for performing different work functions. In a wheel loader, a substantial power is required for operating the work implement, which may lead to that the engine cuts out if the powertrain is loaded simultaneously. It is therefore important to use the different systems in a balanced way with regard to one another. Therefore, the operating information preferably comprises guidance of how to use the operator controlled elements in order to improve the total use of the machine.

Therefore, according to a preferred embodiment, the operating information comprises information for managing a work implement. The work implement may for example be formed by a bucket (for earth or gravel handling), forks (for pallet handling) or grip arms (for log handling). More specifically, in a conventional type of a work machine, a hydraulic system is adapted for controlling the work implement. Therefore, according to a further embodiment, the operating information comprises information for controlling a hydraulic system, which is operatively connected to the work implement.

According to a preferred embodiment, the demonstration comprises visual information displayed to the operator. The visual information is for example displayed on a screen in the operator compartment. The demonstration preferably comprises audio information, such as an automated voice.

According to a preferred embodiment, the method comprises the step of deciding if one of said at least one predetermined demonstration is desired to be presented to the operator on the basis of operator information, which can be provided via an operator input in the form of a code, card or similar or automatically in that the operator is recognized by means of for example a camera. Thus, the presented demonstration can be tailored to the needs of a specific driver on the basis of experience level etc and possibly for performing a specific work task.

According to a preferred embodiment, the method comprises the step of identifying the operator, determining whether a demonstration of the operating information is desired on the basis of the operator identification, and automatically performing said demonstration if it is determined to be desired. The identification may be performed in that the operator makes an input in the form of a code, card or similar or automatically in that the operator is recognized by means of for example a camera. Further, according to one example, the demonstration is only initiated provided it is the first time the operator enters the vehicle.

Other advantageous features and functions of various embodiments of the invention are set forth in the following description.

BRIEF DESCRIPTION OF THE DRAWINGS

The invention will be explained below, with reference to the embodiments shown on the appended drawings, wherein FIG. 1 schematically shows a wheel loader in a side view, FIG. 2 schematically shows a conventional drive train and a conventional hydraulic system in the wheel loader.

DETAILED DESCRIPTION

Figure 1:
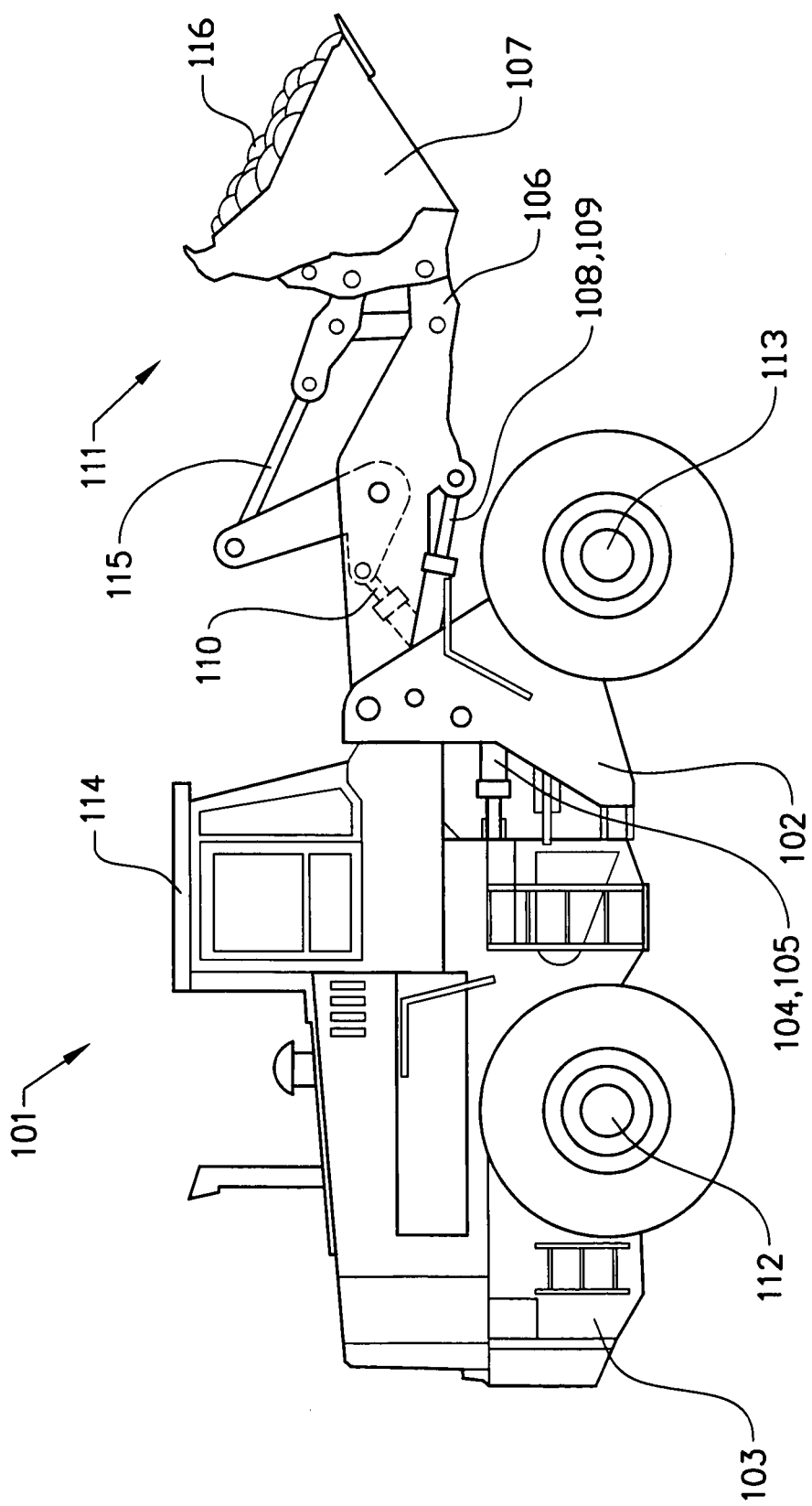

FIG. 1 shows a frame-steered work machine constituting a wheel loader 101. The body of the wheel loader 101 comprises a front body section 102 and a rear body section 103, which sections each has an axle 112,113 for driving ground engaging elements in the form of a pair of wheels. The rear body section 103 comprises a cab 114. The body sections 102,103 are connected to each other in such a way that they can pivot in relation to each other around a vertical axis by means of two first actuators in the form of hydraulic cylinders 104,105 arranged between the two sections. The hydraulic cylinders 104,105 are thus arranged one on each side of a horizontal centerline of the vehicle in a vehicle traveling direction in order to turn the wheel loader 101.

The wheel loader 101 comprises an equipment 111 for handling objects or material. The equipment 111 comprises a load-arm unit 106 and an implement 107 in the form of a bucket fitted on the load-arm unit. A first end of the load-arm unit 106 is pivotally connected to the front vehicle section 102. The implement 107 is pivotally connected to a second end of the load-arm unit 106.

The load-arm unit 106 can be raised and lowered relative to the front section 102 of the vehicle by means of two second actuators in the form of two hydraulic cylinders 108,109, each of which is connected at one end to the front vehicle section 102 and at the other end to the load-arm unit 106. The bucket 107 can be tilted relative to the load-arm unit 106 by means of a third actuator in the form of a hydraulic cylinder 110, which is connected at one end to the front vehicle section 102 and at the other end to the bucket 107 via a link-arm system 115.

Figure 2:
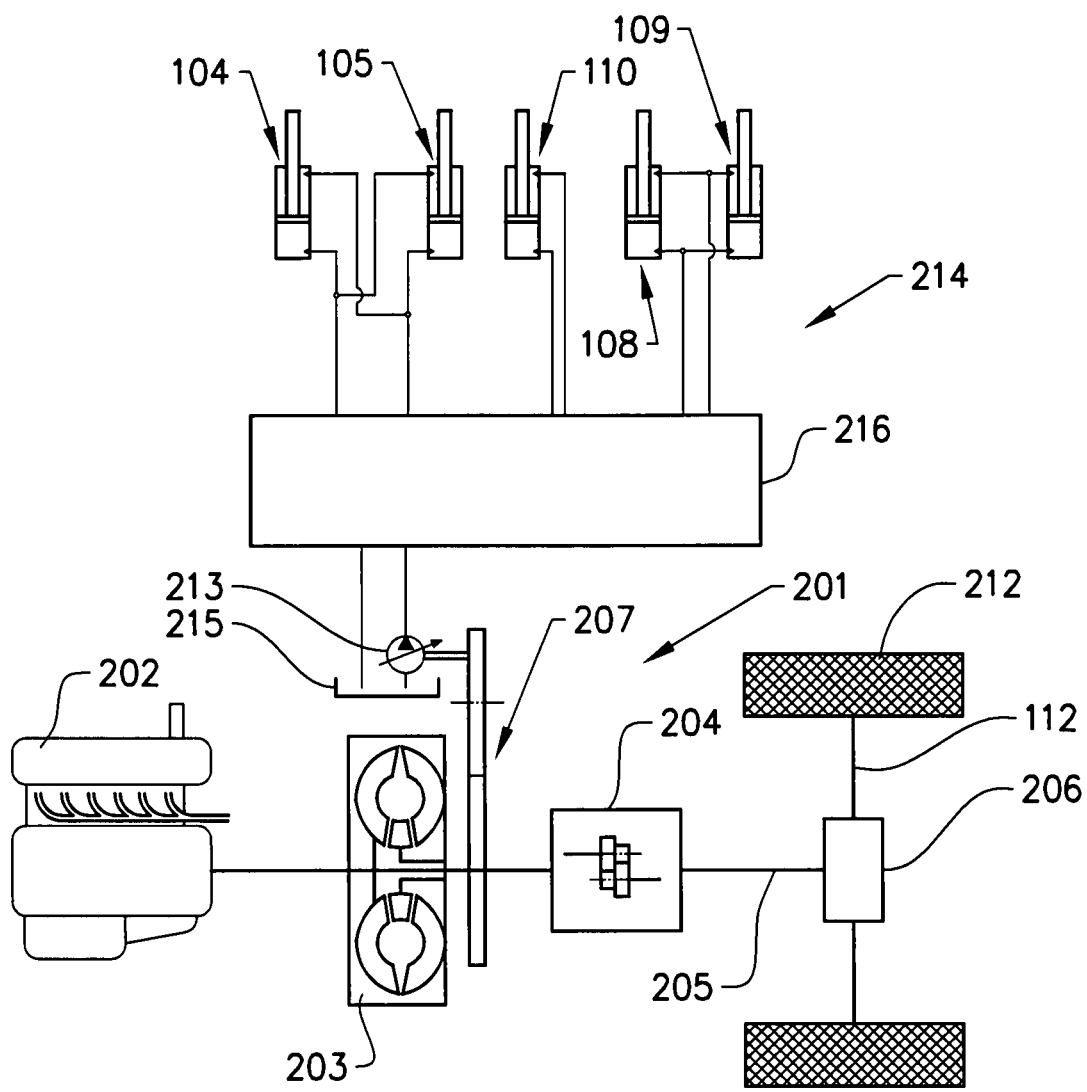

FIG. 2 schematically shows a conventional powertrain 201 and a conventional hydraulic system 214. The powertrain 201 comprises a power source 202 (prime mover) in the form of an internal combustion engine and a transmission for transmitting power from the engine 202 to the wheels 212 for propelling the wheel loader. The engine 202 is preferably a diesel engine. The powertrain 201 is of a mechanical type and comprises from the engine 202 to the wheels 212 the following: a transmission unit 203, in the form of a torque converter, a gearbox 204, a cardan shaft 205, a differential gear 206 and transverse half shafts 112. The gearbox is adapted for varying the speed of the vehicle, and for changing between forward and backward driving direction of the wheel loader 101.

The torque converter 203 is able to increase the torque, which means that the output torque of the torque converter can be for example in the interval 1-3 times the torque of the internal combustion engine 202. Furthermore, the torque converter has preferably a free wheel function and a lock-up function for direct operation without any increased torque. Thus, the transmission ratio of the torque converter in the lockup state is fixed, and preferably substantially 1:1. However, in an alternative embodiment the transmission unit 203 could be an ordinary clutch for disengagement or direct operation without any increased torque. Such a clutch could be a hydraulic clutch as well as a mechanical clutch, such as a variably controlled friction slip clutch.

The engine 202 is adapted to provide a motive power for propelling the vehicle and to operatively drive at least one variable displacement pump 213 in the hydraulic system 214 for lifting operations and steering the wheel loader 101. The hydraulic pump 213 is driven by the internal combustion engine 202, preferably via gear wheels 207 arranged between the torque converter 203 and the gearbox 204.

The pump 213 is configured for delivering pressurized hydraulic fluid from a tank 215 to the cylinders 104,105, 108,109,110. A number of electronically controlled valve units are hydraulically connected between the pump 213 and the cylinders 104,105,108, 109,110 for regulating the reciprocating work of the cylinders. The system of hydraulic valve units is, for ease of presentation, represented by a single box 216.

Figure 3:
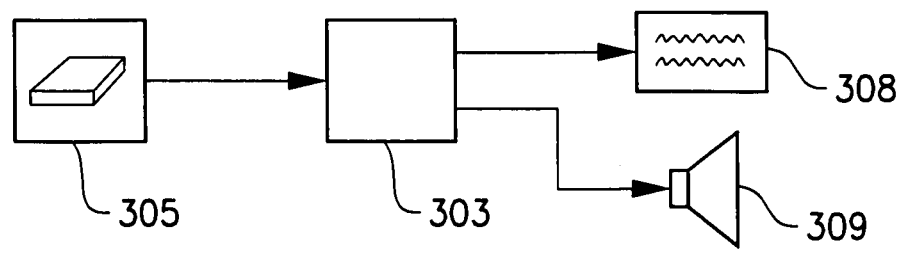
FIG. 3 shows a control system.

FIG. 3 shows a first exemplary embodiment of a control system 301 for controlling the method in the wheel loader 101. The control system 301 comprises a control unit 303 with software for handling the information.

The control system comprises a means 305 for operator input, ie a man-machine-interface. The operator input means 305 comprises means for receiving a card and/or means for inputting a code, such as a keyboard. The input means 305 is operatively connected to the control unit 303 for sending input information to the control unit. The control unit 303 is adapted to identify the operator on the basis of the operator input. The control unit 303 further comprises decision means for deciding whether a demonstration should be automatically presented to the operator or not. The control unit 303 may comprise a plurality of different demonstrations and be adapted to select a specific demonstration based on received operator information/request. For example, an experience level of the identified operator is determined and in response to the determined experience level a suitable demonstration is selected.

A presentation means 307 is operatively connected to the control unit 303. The control unit 303 sends a selected presentation to the presentation means 307, which in turn runs the presentation for the operator. The presentation means 307 may comprise a display means 307 and/or an audio means 309 such as a loud speaker.

The display means may comprise a separate screen in the instrument panel of the vehicle and/or a head-up display, wherein a virtual image is projected from the instrument panel onto the windscreen.

The control unit 303 is commonly known as an Electronic Control Unit (ECU), a Central/Processing Unit (CPU) or an Electronic Control Module (ECM) for an electronic control of the vehicle operation. In a preferred embodiment, the control unit comprises a microprocessor. The control unit 303 comprises a memory, which in turn comprises a computer program with computer program segments, or a program code, for implementing the control method when the program is run. Thus, the demonstration (s) is stored in the memory. The control unit is configured to run the program and thereby present the demonstration, or any part of it, to the operator. This computer program can be transmitted to the control unit in various ways via a transmission signal, for example by downloading from another computer, via wire and/or wirelessly, or by installation in a memory circuit. In particular, the transmission signal can be transmitted via the Internet.

Figure 4:
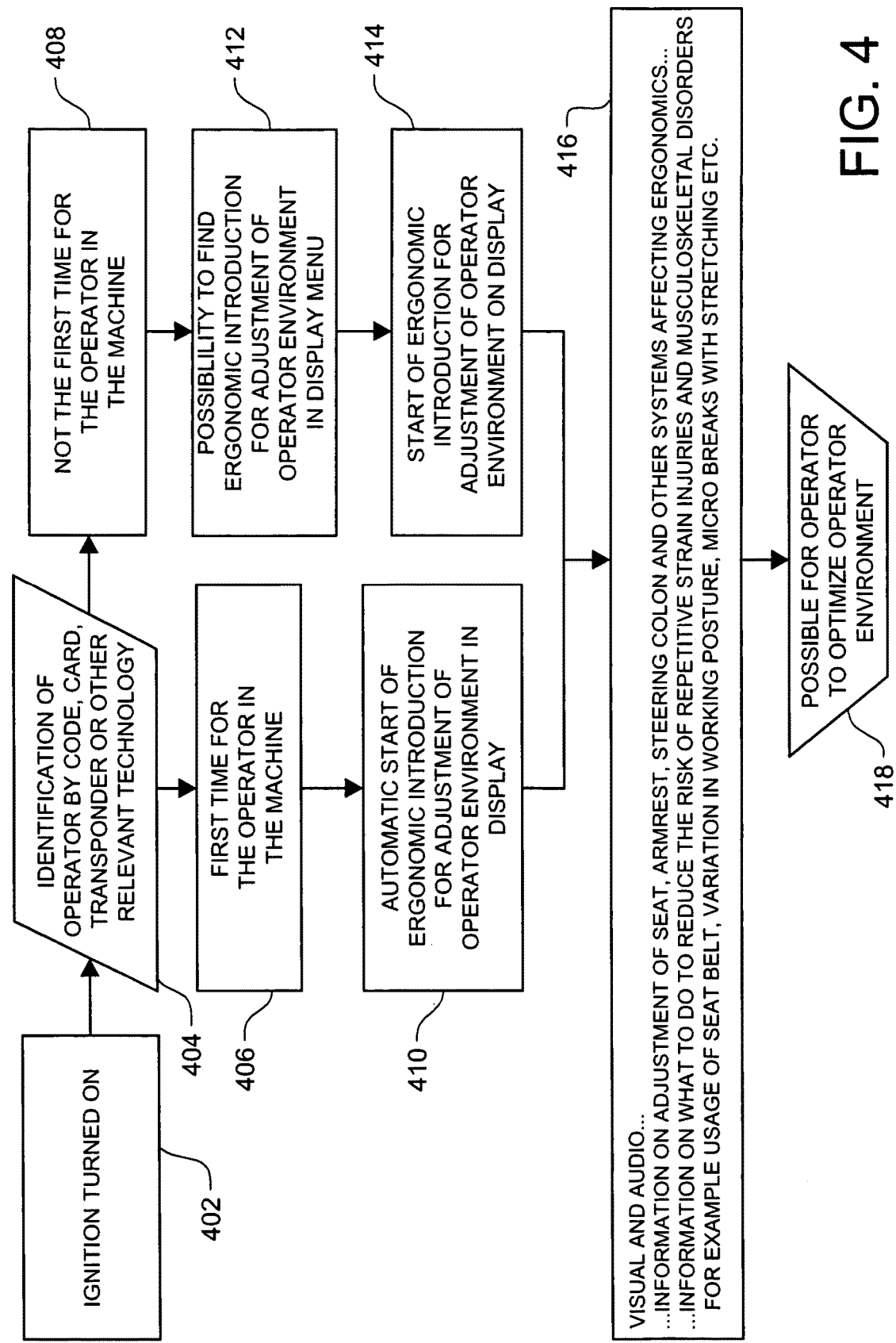
FIGS. 4 and 5 show two examples of a flow chart for an operator instruction method.

FIG. 4 shows a flow chart for presenting ergonomic adjustments of an operator environment to the operator.

In a first block 402, it is determined that the ignition is turned on. In a second block 404, the operator is identified via a code, card, transponder or other means. Further, it is determined if it is the first time the operator enters the specific vehicle, see blocks 406,408. If it is the first time, a demonstration in the form of an ergonomic introduction for adjustments of the operator environment is automatically presented, see block 410.

Alternatively, if it is not the first time the operator enters the machine, the ergonomic instruction will not be presented automatically. Instead, the ergonomic introduction for adjustments of the operator environment is available so that the operator can choose to see it if desired, see block 412. The ergonomic introduction for adjustments of the operator environment is presented if requested by the operator, see block 414.

In block 416, the ergonomic introduction for adjustments of the operator environment is presented to the operator. It comprises information regarding adjustments of the seat, armrest, steering colon etc. Further, the information comprises information regarding usage of safety belt, variation in working posture, micro breaks with stretching etc.

Block 418 indicates that the operator manually optimizes the operator environment in accordance with the provided recommendations.

Figure 5:
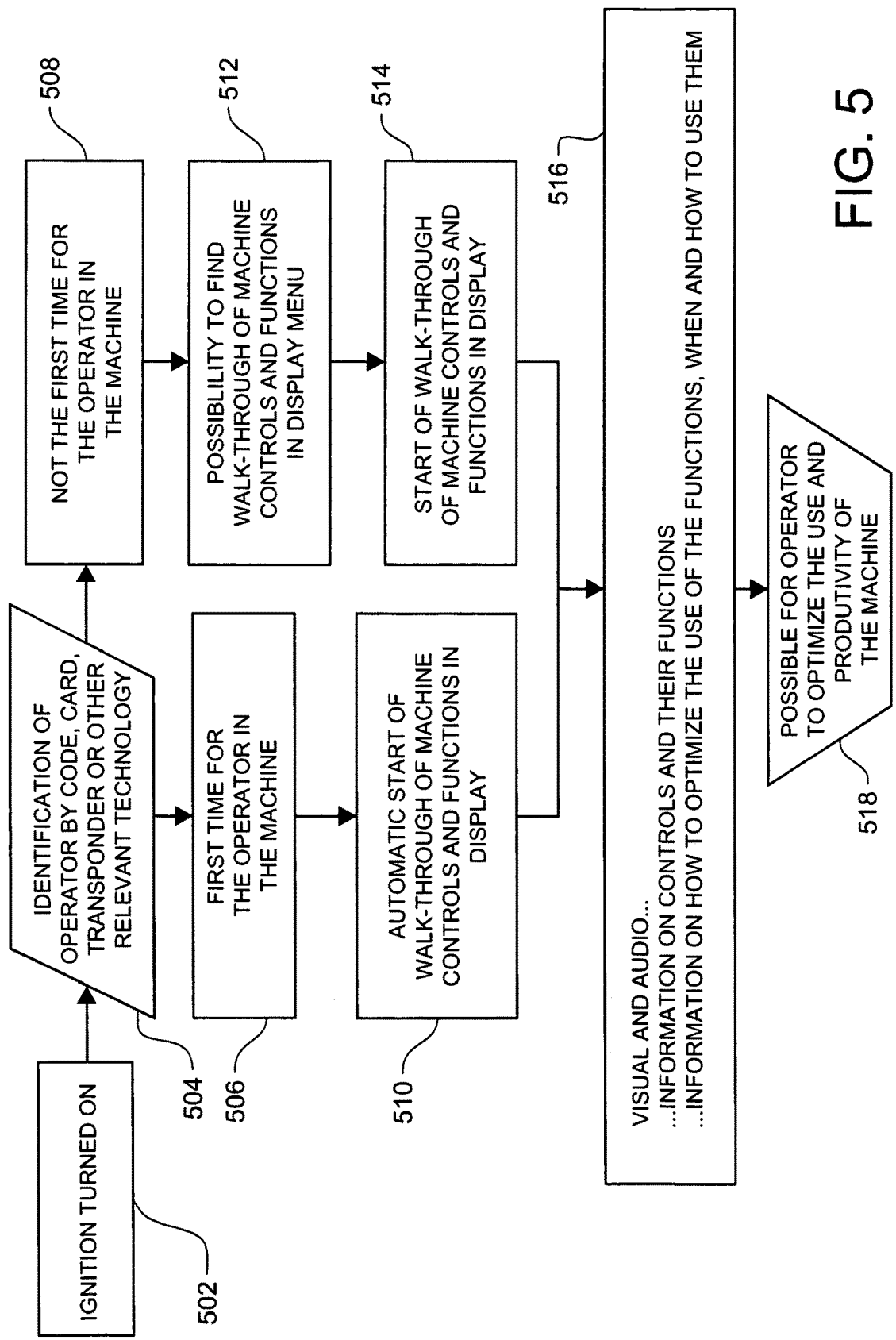
Figure 6A:
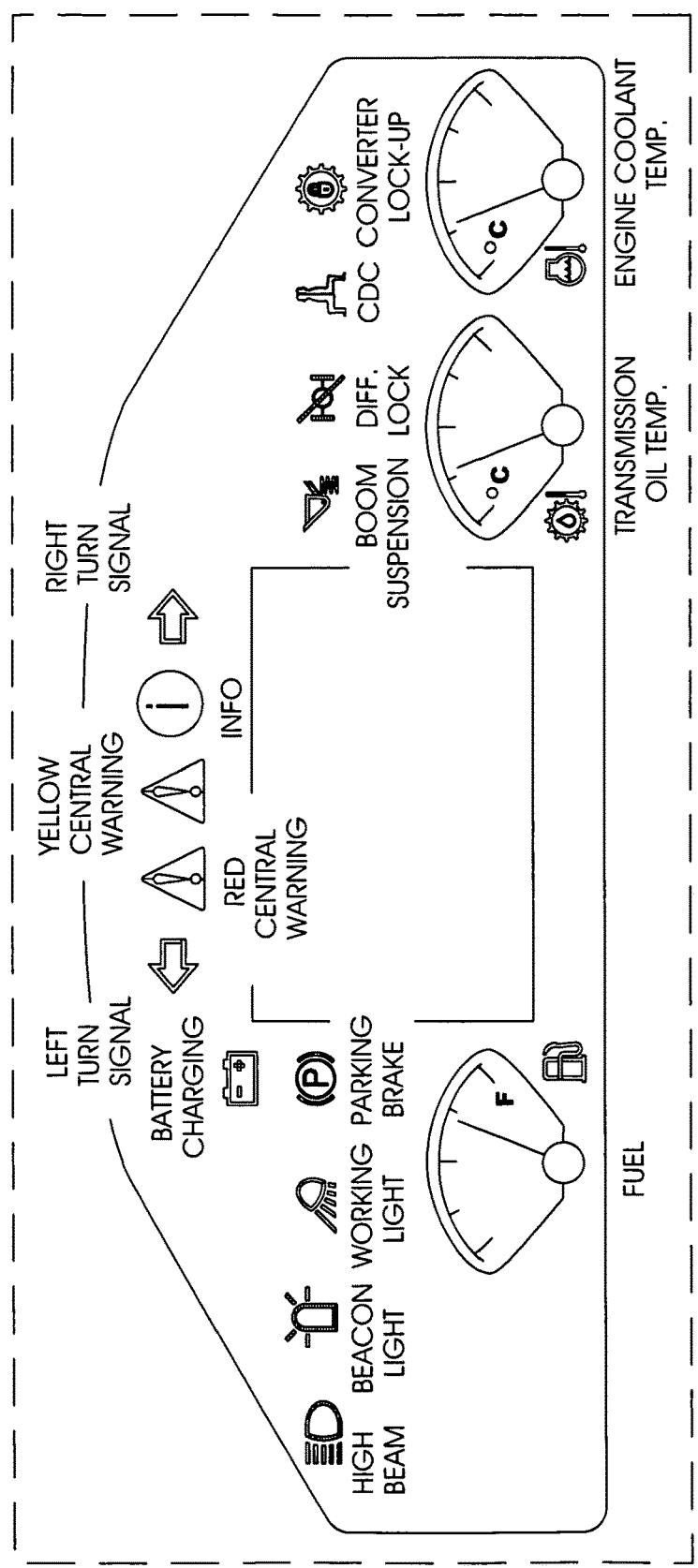
FIG. 6 shows an operator environment.
Figure 6B:
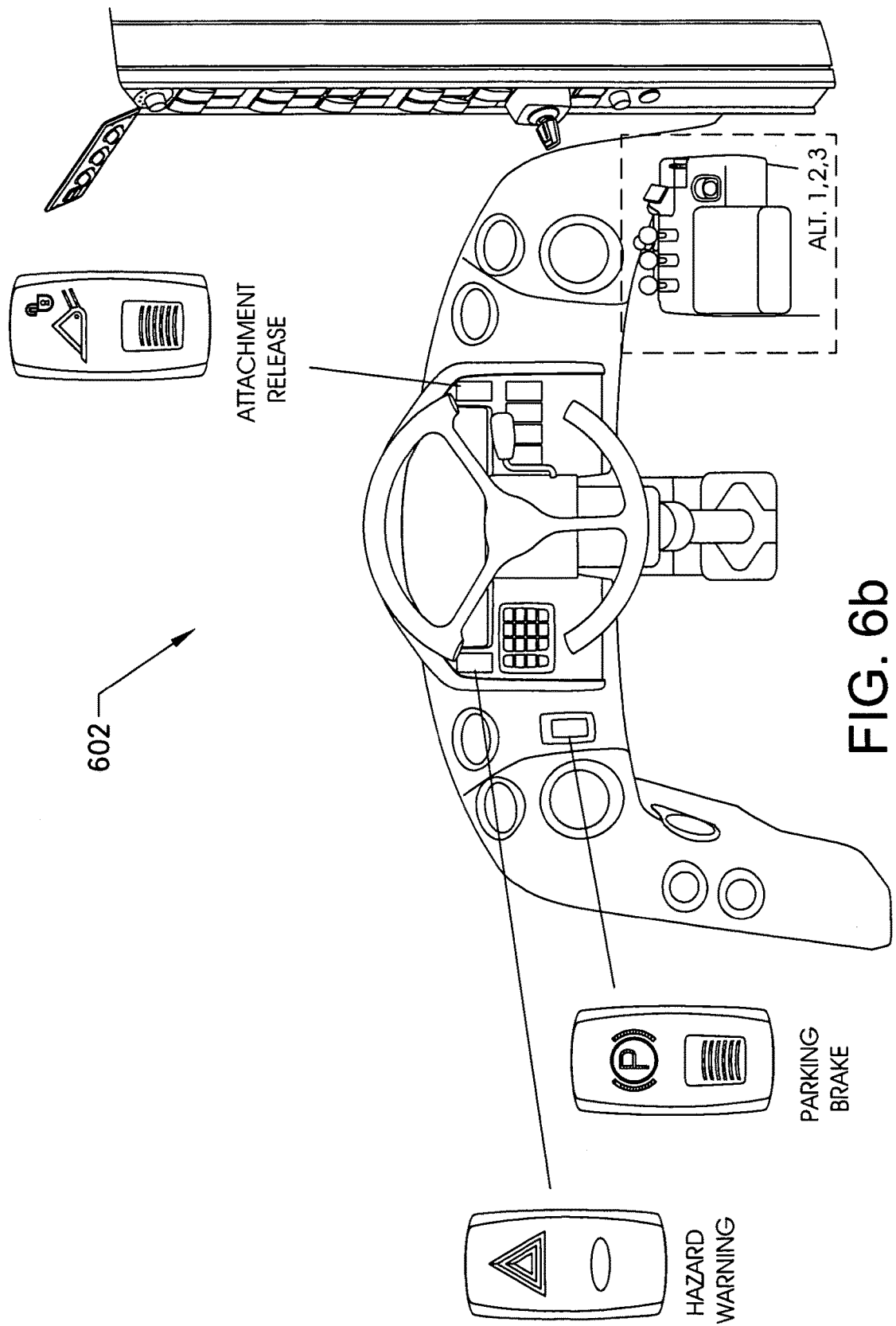
Figure 6C:
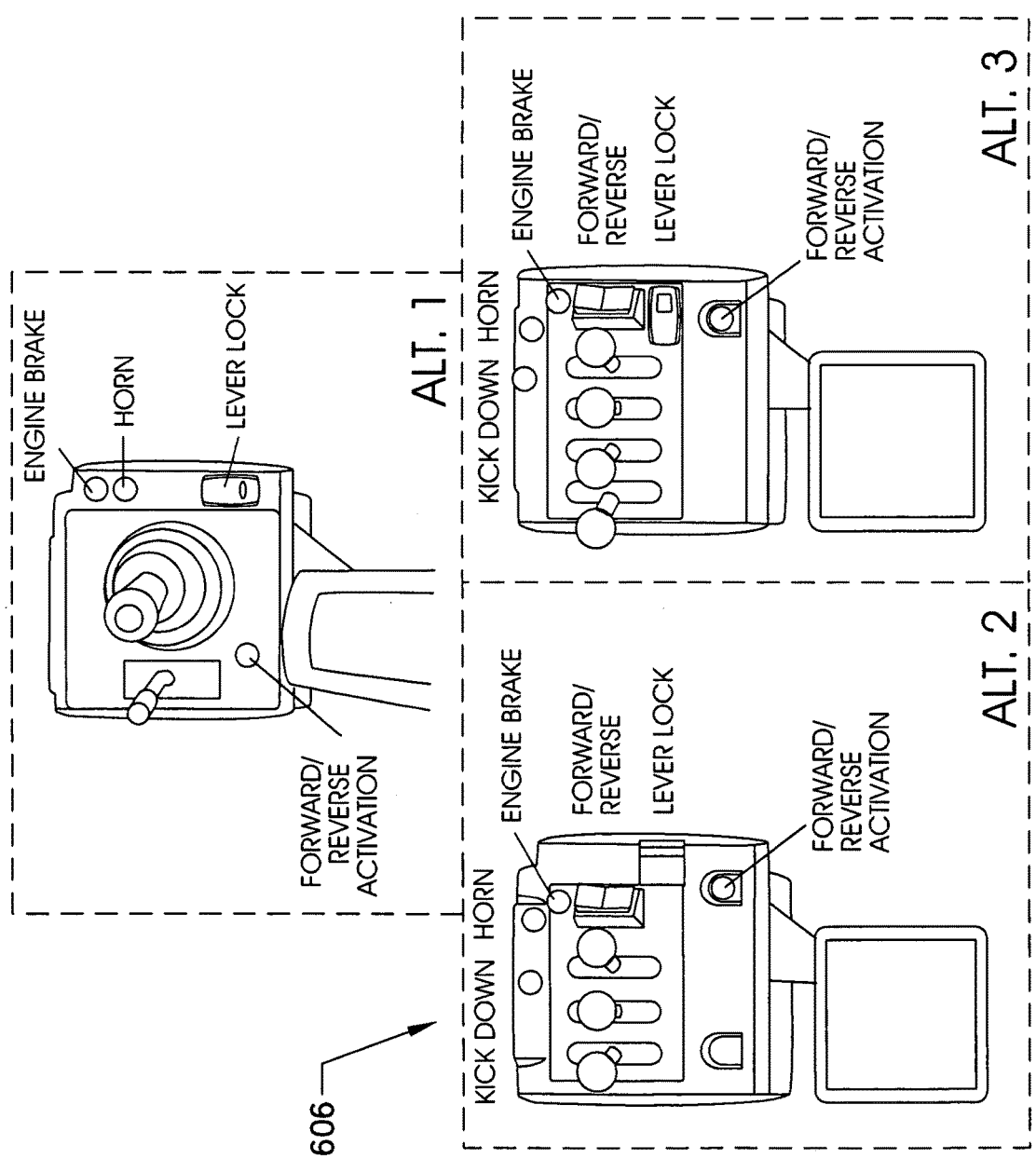
Figure 6D:
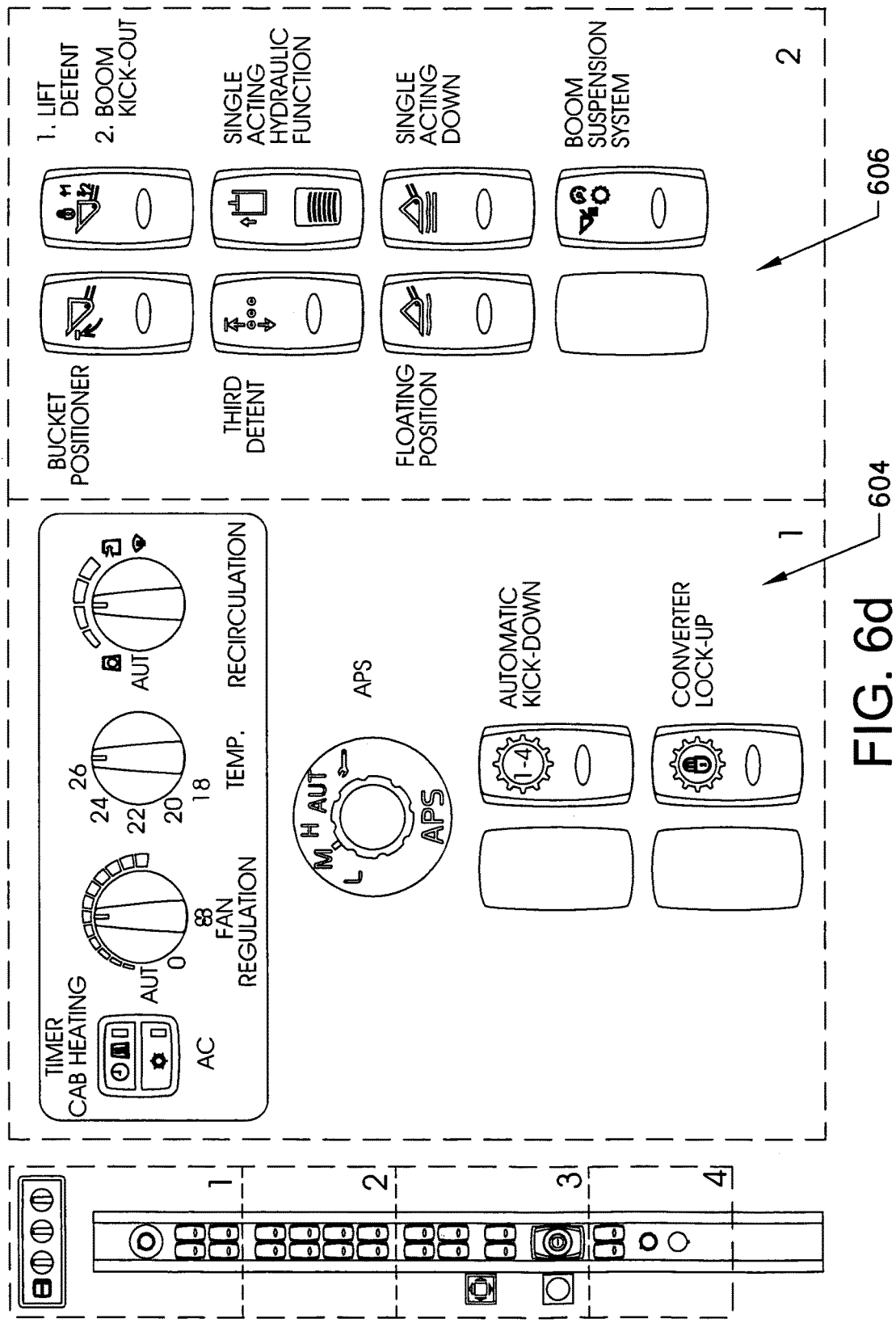
Figure 6E:
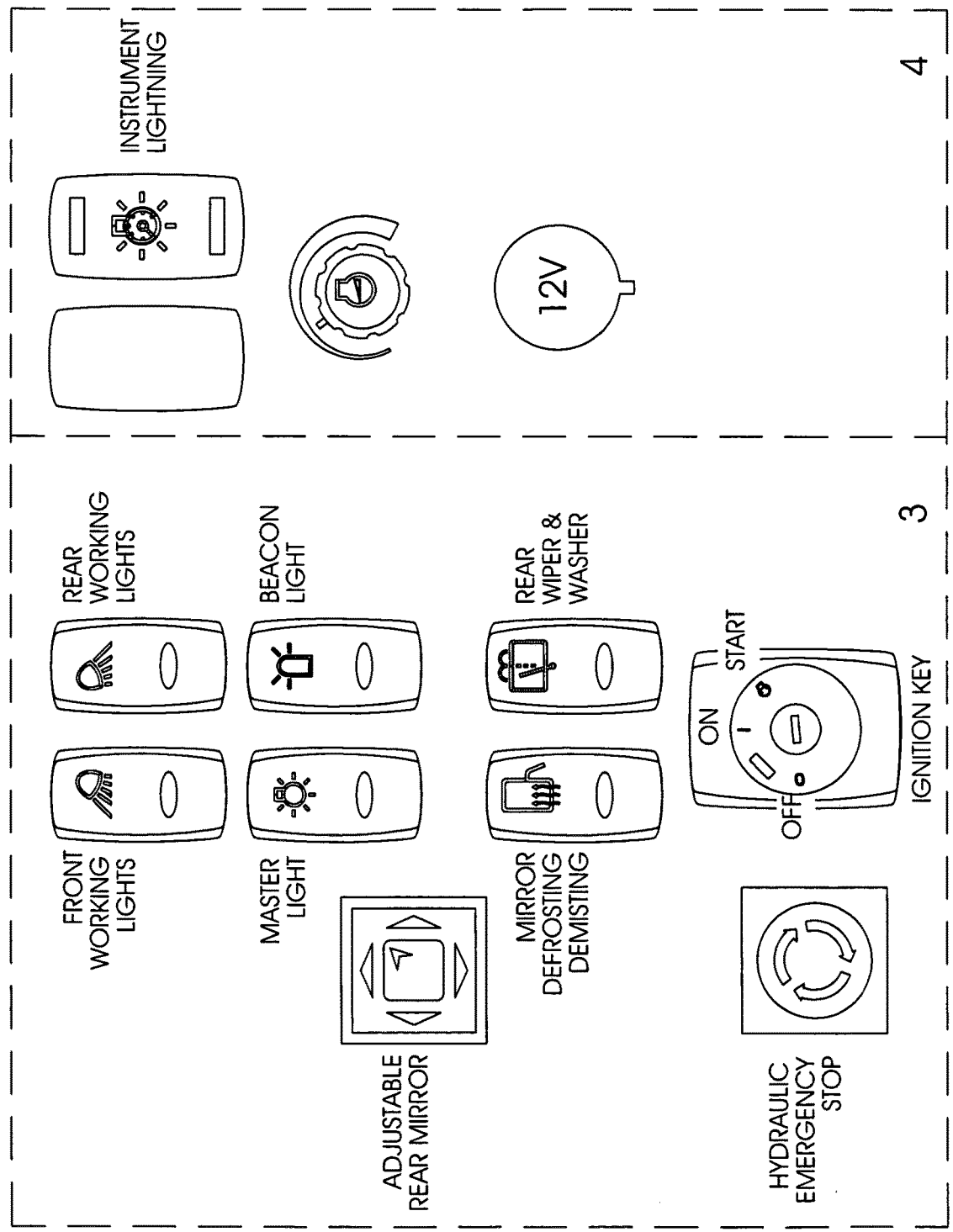

FIG. 5 shows a flow chart for presenting a walkthrough of controls and functions to the operator.

In a first block 502, it is determined that the ignition is turned on. In a second block 504, the operator is identified via a code, card, transponder or other means. Further, it is determined if it is the first time the operator enters the specific vehicle, see blocks 506,508. If it is the first time, a demonstration in the form of a walk-through of controls and functions is automatically presented, see block 510.

Alternatively, if it is not the first time the operator enters the machine, the walk-through of controls and functions will not be presented automatically. Instead, the walk-through of controls and functions is available so that the operator can choose to see it if desired, see block 512. The walk-through of controls and functions is presented if requested by the operator, see block 514.

In block 516, the walk-through of controls and functions is presented to the operator. It comprises information on the controls and their functions. Further, the information comprises information regarding how to optimize the use of the functions; when and how to use them.

Block 518 indicates that the operator manually optimizes the use and productivity of the machine in accordance with the provided recommendations.

According to a further development, the method comprises the step of monitoring use of the machine in operation and after a specific period, for example after a work cycle, a work shift, after a predetermined period of time etc presents feedback to the operator on his use of the machine. In this way, the use can be further optimized.

According to a further development, the method comprises the step of determining if the vehicle is in a non-operative state and only automatically presenting the demonstration to the operator if the vehicle is in the non-operative state. The non-operative state is defined by the vehicle standing still. Further, the method may be adapted to interrupt the demonstration if the state of the vehicle is changed to an operative state.

FIG. 6 shows an example of an operator environment 602 in the cab of the wheel loader 101. A plurality of operator controlled elements (levers, buttons and other controls) are provided. Providing a predetermined demonstration of the operating information is especially important in such a work machine in order to further improve the efficiency of the work machine operation.

Especially, a first set of controls 604 (in the form of push buttons and a rotatable knob) is related to selection of different powertrain functions. A second set of controls 606 is related to control of the work implement and the lift arm arrangement via the hydraulic system. The second set comprises a plurality of push buttons for selecting different functions and at least one operation lever or joystick (see alternative 1,2 and 3) for manually maneuvering the work implement and the lift arm arrangement via the hydraulic system. According to alternative 2 and 3, a plurality of levers is provided comprising a lift lever a tilt lever and a lever for operating a third function.

In addition to all operator controlled elements for operating the work machine, see figure β, there are control and adjustment possibilities provided for an operator seat 701, see FIGS. 7-10. It is important that each individual driver adjusts the seat for an efficient operation (in order to avoid fatigue and possibly injuries).

Figure 7:
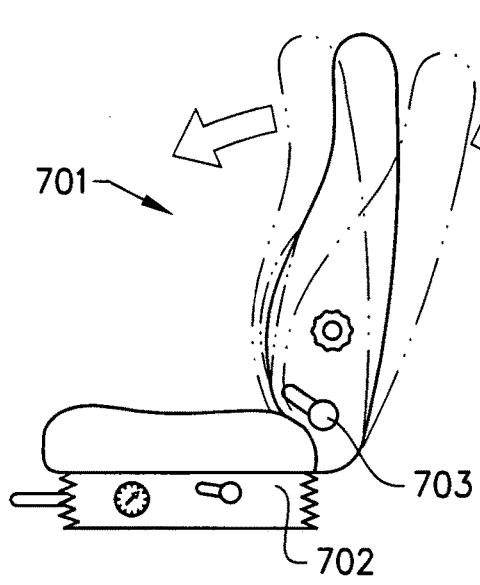
FIG. 7-10 show adjustment possibilities of an operator seat.
Figure 8:
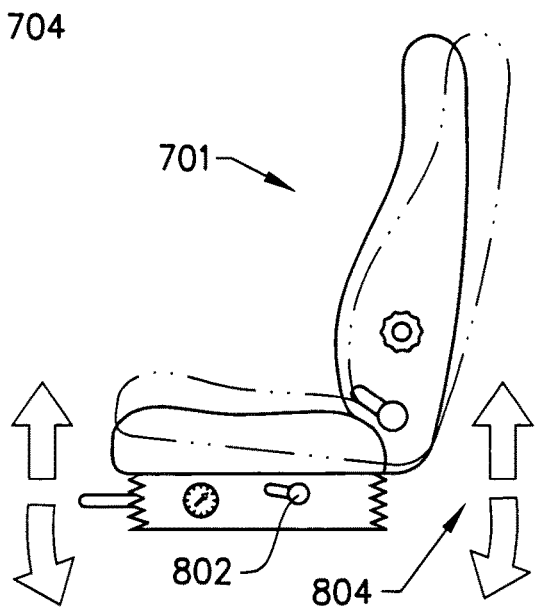
Figure 9:
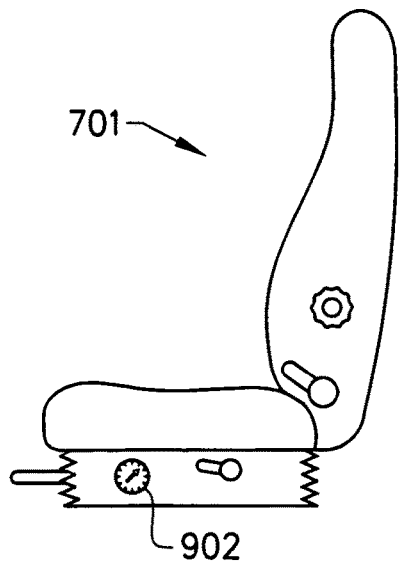
Figure 10:
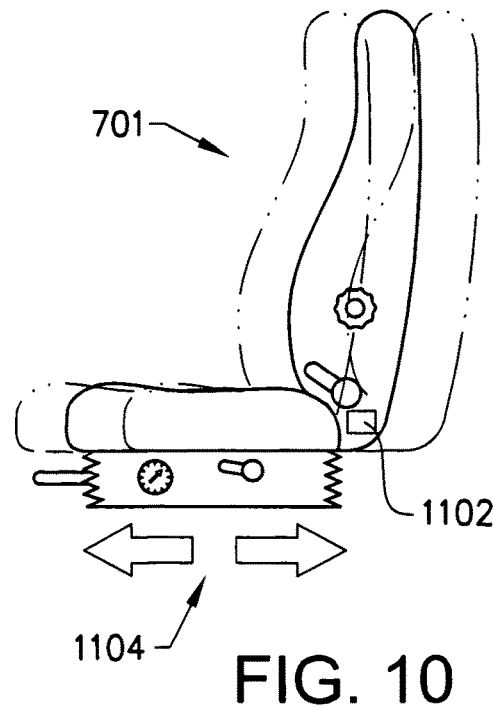

FIG. 7 shows the possibility of pivoting the back rest back and forth, see arrows 704, via a first seat control means 702 (a handle), and lumbar support 703 (via turning a knob). FIG. 8 shows the possibility of adjusting the seat inclination about a horizontal axis extending in a transverse direction with regard to the driving direction, see arrows 804, via a second seat control means 802 (handles) and raising/lowering the seat. FIG. 9 indicates an operator weight adjustment means 902 (a weight adjusting wheel). FIG. 10 shows the possibility of adjusting the seat back and forth for leg room, see arrows 1004, via a further seat control means 1002 (a bar).

Figure 11:
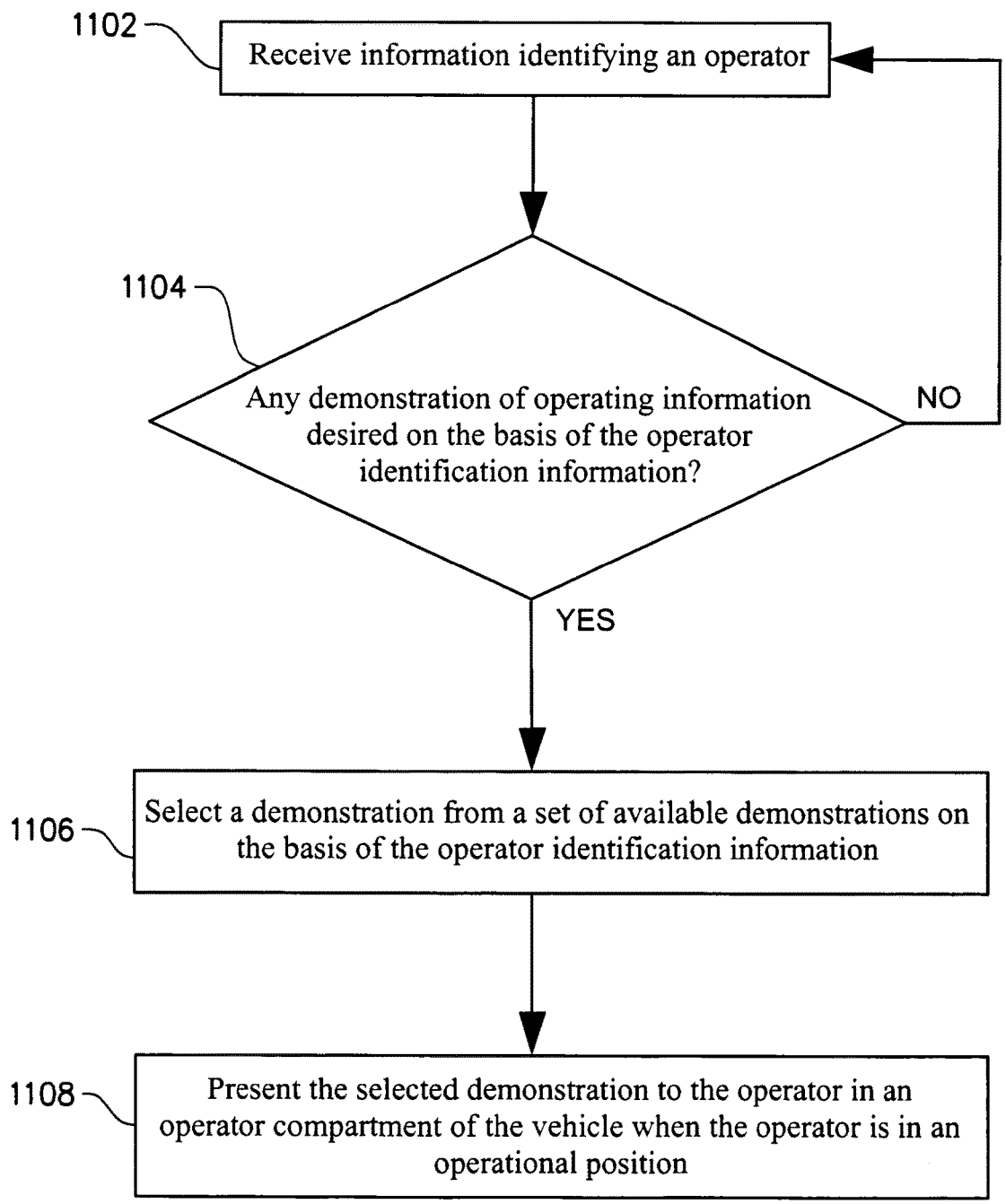
FIG. 11 shows a further example of a flow chart for an operator instruction method.

FIG. 11 shows a further example of a flow chart for providing an operator of a vehicle with operating information. In a first box 1102 information identifying an operator is received. In a second box, it is determined whether any demonstration of operating information is desired (or required) on the basis of the operator identification information. If it is determined that a demonstration is desired/required, the chart moves on to box 1106, in which a demonstration is selected from a set of available demonstrations on the basis of the operator identification information. Then, in box 1108, the selected demonstration is presented to the operator in the operator compartment when the operator is in an operational position (normally seated). If no demonstration is determined to be required in step 1104, no demonstration is presented to the operator. The process starts again in step 1102 when the next operator is identified in a consecutive work shift.

The invention is not in any way limited to the above described embodiments, instead a number of alternatives and modifications are possible without departing from the scope of the following claims.

According to an alternative to the step of determining if it is the first time the operator enters the specific vehicle ever, it may be determined if it is the first time within a certain time period, such as a month or a year, and only automatically performing said demonstration if it is the first time within the specific time period Further, according to an alternative to determining if it is the first time the operator enters a specific individual vehicle, it may be sufficient to determine if it is the first time he enters the specific vehicle type or model.

According to an alternative or complement to receiving an input, such as a card or code, from the operator for identification of the operator, an automatic recognition system is used. Such an automatic recognition system comprises a picture reproduction unit, such as a camera, for reproducing an image of the operator and means for analyzing the picture with regard to for example the shape of the face and/or characteristics of the eyes of the operator etc.

The invention claimed is:

1. A method for providing an operator of a vehicle with operating information for at least one of operating vehicle equipment and performing vehicle functions, comprising the steps of
   automatically determining operator information regarding an identity of the operator with an automatic recognition system,
   automatically operating a presentation means and presenting at least one predetermined demonstration to the operator in an operator compartment of the vehicle based on information consisting of the operator information, that the operator is in an operational position, and that the operator information includes that it is a first time that the operator has entered a specific vehicle or a specific vehicle type within a certain time period, and
   determining that the operator information includes that it is not the first time that the operator has entered the specific vehicle or the specific vehicle type within a certain time period and not automatically operating the presentation means and presenting the at least one predetermined demonstration to the operator except upon request for a presentation of the at least one predetermined demonstration by the operator.

2. A method according to claim 1, wherein the at least one demonstration comprises visual information.

3. A method according to claim 2, wherein the presentation means comprises a screen, the method comprising the step of presenting the visual information on the screen in the operator compartment.

4. A method according to claim 1, wherein the at least one demonstration comprises audio information.

5. A method according to claim 1, automatically determining if one of the at least one demonstration is desired to be presented to the operator on the basis of operator information.

6. A method according to claim 1, determining if one of the at least one demonstration is desired to be presented to the operator on the basis of an active operator input.

7. A method according to claim 1, comprising the step of determining an experience level of the operator and in response to the determined experience level selecting a suitable demonstration of the at least one demonstration.

8. A method according to claim 1, making the at least one demonstration available for selection by an operator request and automatically presenting the at least one demonstration if requested.

9. A method according to claim 1, comprising the step of providing a plurality of different predetermined demonstrations and presenting a specific demonstration from said plurality of different predetermined demonstrations.

10. A method according to claim 1, wherein the operating information for the at least one of operating vehicle equipment and performing vehicle functions comprises information regarding an operator environment in the compartment.

11. A method according to claim 1, wherein the operating information for the at least one of operating vehicle equipment and performing vehicle functions comprises information regarding available ergonomic adjustments of an operator environment.

12. A method according to claim 1, wherein the operating information for the at least one of operating vehicle equipment and performing vehicle functions comprises a walk-through of a predetermined set of available operator environment adjustments in the operator compartment.

13. A method according to claim 1, wherein the operating information for the at least one of operating vehicle equipment and performing vehicle functions comprises recommendations on variations in the operator behaviour and/or position during a work shift.

14. A method according to claim 1, wherein the operating information for the at least one of operating vehicle equipment and performing vehicle functions comprises information regarding operator controlled elements in the compartment for operating the vehicle.

15. A method according to claim 14, wherein the operating information for the at least one of operating vehicle equipment and performing vehicle functions comprises information regarding an optimum use of each of a predetermined set of operator controlled elements.

16. A method according to claim 1, wherein the operating information for the at least one of operating vehicle equipment and performing vehicle functions comprises a walk-through of a predetermined set of operator controlled elements.

17. A method according to claim 1, wherein the operating information for the at least one of operating vehicle equipment and performing vehicle functions comprises information regarding the function of each of a predetermined set of operator controlled elements.

18. A method according to claim 1, comprising the step of determining if the vehicle is in a non-operative state and only automatically presenting the at least one demonstration to the operator if the vehicle is in the non-operative state.

19. A method according to claim 18, wherein the non-operative state is defined by the vehicle standing still.

20. A method according to claim 18, comprising the step of interrupting the at least one demonstration if the state of the vehicle is changed to an operative state.

21. A method according to claim 1, wherein the vehicle is a work machine.

22. A method according to claim 21, wherein the operating information for the at least one of operating vehicle equipment and performing vehicle functions comprises information for managing a work implement.

23. A method according to claim 21, wherein the operating information for the at least one of operating vehicle equipment and performing vehicle functions comprises information for controlling a hydraulic system which is operatively connected to a work implement.

24. A method according to claim 21, wherein the operating information for the at least one of operating vehicle equipment and performing vehicle functions comprises information for propelling the work machine.

25. A method according to claim 21, wherein the operating information for the at least, one of operating vehicle equipment and performing vehicle functions comprises information for controlling a powertrain which is operatively connected to ground engaging elements.

26. A computer readable medium including a computer program for implementing the method as claimed in claim 1.

27. A computer programmed with a computer program for implementing the method as claimed in claim 1.

28. A method for providing an operator of a vehicle with operating information for at least one of operating vehicle equipment and performing vehicle functions, comprising the steps of
automatically determining operator information regarding an identity of the operator with an automatic recognition system,
automatically operating a presentation means and presenting at least one predetermined demonstration to the operator in an operator compartment of the vehicle based on the operator information when the operator is in an operational position and when the operator information includes that it is a first time that the operator has entered a specific vehicle or a specific vehicle type within a certain time period, and
determining that the operator information includes that it is not the first time that the operator has entered the specific vehicle or the specific vehicle type within a certain time period and not automatically operating the presentation means and presenting the at least one predetermined demonstration to the operator except upon request for a presentation of the at least one predetermined demonstration by the operator,
wherein the vehicle is a work machine,
wherein the operating information for the at least one of operating vehicle equipment and performing vehicle functions comprises information regarding an optimum use of the vehicle functions, the method further comprising
monitoring use of the vehicle functions, and
after a predetermined period of use of the vehicle functions by the operator, comparing the operator's use of the vehicle functions to optimum use of the vehicle functions, and providing feedback to the operator regarding the comparison.

29. A method according to claim 28, wherein the vehicle functions comprise powertrain functions.

30. A method according to claim 28, wherein the vehicle functions comprise work implement functions.

31. A method for providing an operator of a vehicle with operating information for at least one of operating vehicle equipment and performing vehicle functions, comprising the steps of
automatically determining operator information regarding an identity of the operator in an operator compartment of the vehicle with an automatic recognition system, the operator information including whether it is the first time that the operator has entered a specific vehicle or a specific vehicle type within a certain time period,
in response to information consisting of determining that the operator is in an operational position in the operator compartment and that it is the first time that the operator has entered the specific vehicle or the specific vehicle type within the certain time period automatically operating a presentation means and presenting at least one predetermined demonstration to the operator, and
in response to determining that it is not the first time that the operator has entered the specific vehicle or the specific vehicle type within the certain time period not automatically operating the presentation means and presenting the at least one predetermined demonstration to the operator except upon request for a presentation of the at least one predetermined demonstration by the operator.

* * * * *